United States Patent Office 3,454,369
Patented July 8, 1969

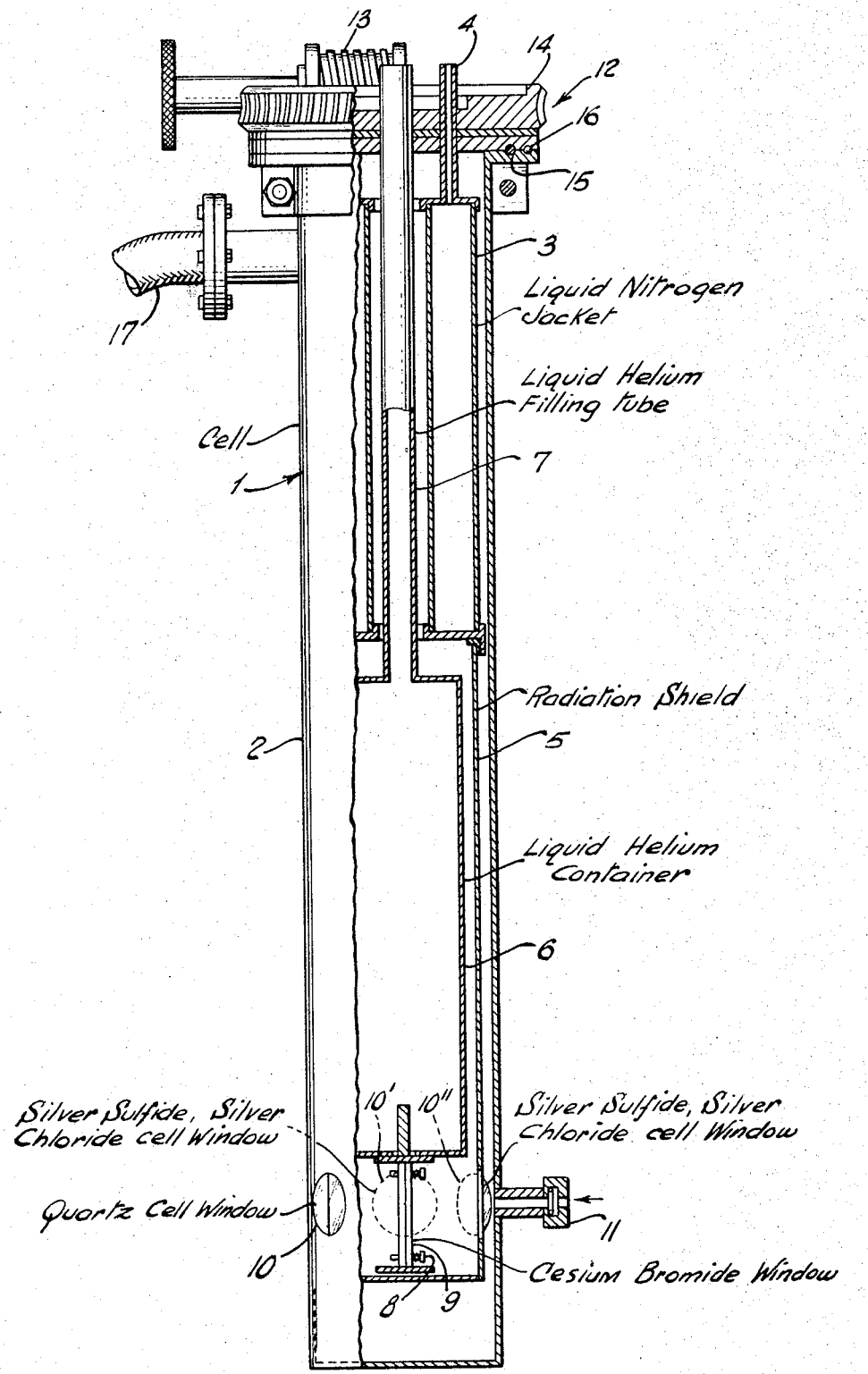

3,454,369
MONO-OXYGEN MONOFLUORIDE AND METHOD OF PREPARATION
Alfred Arkell, Wappingers Falls, Russell R. Reinhard, Hopewell Junction, Robert Y. Heisler, Wappingers Falls, and Lewis P. Larson, Fishkill, N.Y., assignors to Texaco Inc., New York, N.Y., a corporation of Delaware
Filed Apr. 2, 1965, Ser. No. 445,081
Int. Cl. C01b 7/20
U.S. Cl. 23—315                                   11 Claims

ABSTRACT OF THE DISCLOSURE

Method of producing mono-oxygen monofluoride comprising irradiating a solid solution of mono-oxygen difluoride in a matrix of nitrogen, argon, neon, krypton, zeon, sulfur hexafluoride, hexafluoromethane or trifluorochloromethane with actinic light of a wavelength of between about 2200 and 6000 angstroms, optionally in the presence of nitrous oxide or carbon dioxide; the mono-oxygen monofluoride resulting therefrom and the composition of matrix and mono-oxygen monofluoride resulting therefrom, said mono-oxygen monofluoride useful in the preparation of oxidizers for fuels.

---

This invention relates to a paramagnetic compound. More specifically it is directed to mono-oxygen monofluoride of the formula OF and to a method of preparation thereof. The invention also pertains to solid compositions of oxygen monofluoride in inert matrices.

The mono-oxygen monofluoride compound of the invention is useful as a reactant or intermediate in the preparation of known inorganic and organic compounds containing the fluoroxy group, for example, the dimerization of the mono-oxygen monofluoride to form dioxygen difluoride. Dioxygen difluoride is useful as an oxidizer in fuels.

In the past the existence of mono-oxygen monofluoride was postulated and the possibility of its existence was speculated as a result of indirect evidence such as the electron impact studies reported in an article by Dibeler et al. in the "Journal of Chemical Physics," 27, pp. 1296–1297 (December 1957). As pointed out in the article, some of the prior indirect evidence supposedly establishing the existence of mono-oxygen monofluoride was subsequently disproven and shown in fact to demonstrate that no mono-oxygen monofluoride was prepared by the prior researchers.

We have discovered, and this constitutes the invention, a method of preparing and isolating mono-oxygen monofluoride, and as a corollary, positively establishing its existence.

More particularly, the method of preparation broadly comprises forming mono-oxygen monofluoride by irradiating with actinic light a composition comprising an inert matrix maintained in the solid state having mono-oxygen difluoride of the formula $OF_2$ distributed therethrough in a mole ratio of matrix to mono-oxygen difluoride of at least about 10:1 and up to 1000:1 and higher at a temperature below the diffusion temperature of the matrix, e.g., below about 35° K. The materials contemplated for use as matrix are members selected from the group consisting of nitrogen, argon, neon, krypton, xenon, trifluorochloromethane, sulfur hexafluoride, and dicarbon hexafluoride.

The solid matrix-mono-oxygen difluoride solution is prepared by first forming a mixture of matrix and mono-oxygen difluoride in a mole ratio of matrix to mono-oxygen difluoride of at least about 10:1. Since the contemplated matrix and mono-oxygen difluoride are normally gases at room temperature, this is readily accomplished by standard means such as by mixing the matrix and mono-oxygen difluoride in the gaseous state, e.g., at room temperature. The thus formed gas mixture is then cooled below the solidification temperature of the matrix and mono-oxygen difluoride, preferably in the temperature range of between about 4 and 20° K., thus forming a solid solution of matrix and mono-oxygen difluoride. In order to facilitate complete irradiation of the solid matrix-$OF_2$ solution the thickness of the solid solution should be such as to permit the actinic light to irradiate all parts thereof. Therefore, the formation of solid matrix-$OF_2$ solution is normally accomplished by depositing the gaseous solution of matrix and mono-oxygen difluoride on a surface maintained below solidification point of the solution, e.g., between about 4 and 20° K., thereby promoting the deposition on said surface of solid matrix-$OF_2$ solution in layer form. The deposition on the cold solidifying surface is continued until the desired thickness of solid layered matrix-$OF_2$ solution is obtained, e.g. advantageously less than about 0.01 cm. thickness.

The actinic light contemplated is that light having wave lengths in the range between about 2,200–6,000 angstroms (A.). Sources of the contemplated actinic light are mercury vapor lamp, carbon arc lamp, tungsten arc lamp, Kromeyer lamp, hydrogen discharge lamp and sunlight. The irradiation is advantageously conducted at a temperature below about 35° K., preferably between about 4 and 20° K., and as heretofore stated, below the diffusion temperature of the inert matrix for a period of between about 10 to 30 minutes and advantageously until at least about 0.2 watt per cubic centimeter (watts/cm.$^3$) of initial solid matrix-$OF_2$ solution are absorbed.

In one embodiment of the method of invention an additive is included to increase the production of the mono-oxygen mono-fluoride. The additive is a normally gaseous member selected from the group consisting of nitrous oxide and carbon dioxide and is incorporated in the gaseous mixture of mono-oxygen difluoride and matrix prior to solidification and irradiation. The maximum molar concentration of additive to mono-oxygen difluoride is critical to the yield of mono-oxygen monofluoride since the presence of a mole ratio of additive to $OF_2$ greater than about 4:1 actually retards rather than accelerates the production of mono-oxygen monfluoride. The mole ratio of additive to initial mono-oxygen difluoride is therefore advantageously less than about 4:1, preferably between about 0.1:1 and 1:1.

The apparatus employed in illustrating the method of the invention is described in the figure of the drawing. The figure represents a vertical cross section of a cell for formation of the solid solution of matrix and oxygen difluoride and the irradiation thereof to produce mono-oxygen monofluoride. More specifically, cell 1 is composed of outer brass cylinder 2, copper liquid nitrogen jacket 3 connected to liquid nitrogen filling tube 4, copper radiation shield 5, brass liquid helium container 6 connected to liquid helium filling tube 7, copper crystal speciment holder 8 holding cesium bromide window 9 and connected to the bottom of container 6. The lower part of outer brass cylinder 2 is fitted with three cell windows ports 10, 10', 10" and also fitted with spray on tube inlet 11. Cell window 10 is composed of quartz to permit the passage of the desired actinic light therethrough. Cell windows 10' and 10" are silver sulfide coated silver chloride windows to permit infrared analysis. Liquid nitrogen jacket 3 and liquid helium filling tube 7 are connected to rotatable brass flange member 12 which is fitted with worm gears 13 and 14, and O ring 15 and steel ball bearings 16. Flexible steel hose 17 is connected to cylinder 2 and thermocouple wires (not shown) are connected into cell 1 via a sealing gland (not shown) in flange member 12.

In the actual operation of cell 1, cell 1 is evacuated through hose 17. The vacuum is maintained throughout the operation of the cell. Liquid nitrogen is added to nitrogen jacket 3 through filling tube 4 and liquid helium is added to pre-liquid nitrogen cooled helium container 6 through tube 7. Upon the cooling of cesium bromide window 9 to the desired temperature the inner part (container, window, jacket, shield, and flange member) of cell 1 is rotated via the turning of worm gear 14 so that face of cesium bromide window 9 is perpendicular to spray on tube inlet 11. The gaseous solution of matrix and $OF_2$ (also additive if used) is passed through inlet 11 and condensed and solidified on cesium bromide window 9. Upon condensation of the desired amount of gaseous solution introduction of the gas is ceased. An actinic light source (not shown) and the position of cesium bromide window 9 are then adjusted so that the actinic light passes through quartz cell window 10 and strikes the solid inert matrix-oxygen difluoride (and additive if used) solution coating cesium bromide window 9. The irradiation is continued for the desired period of time whereupon inner portion of cell 1 is rotated so that cesium bromide window 9 is lined up with silver sulfide coated silver chloride cell windows 10' and 10" for infrared analysis.

EXAMPLE I

This example illustrates the preparation of mono-oxygen monofluoride of the formula OF.

The apparatus and procedure described above was essentially utilized. The gaseous mixture introduced in cell 1 was a solution of nitrogen and mono-oxygen difluoride in a mole ratio of 40:1 of $N_2:OF_2$. The actinic light was ultraviolet light generated by General Electric BH6 mercury lamp and the cell window 10 was a 5 cm. quartz cell filled with water permitting light of 2200 to 6000 A. wave length to pass therethrough. Cesium bromide window 9 was maintained at 4° K. and the gaseous mixture of nitrogen and mono-oxygen difluoride was condensed thereon as a solid at a rate of about 115 micromoles/minute for a period of about 30 minutes. At the end of the 30 minute period the solid nitrogen-$OF_2$ coated cesium bromide window 9 was irradiated for a period of 69 minutes. The amount of irradiation absorbed by the solid nitrogen-$OF_2$ was about 0.2 watt/cm.$^3$. During irradiation nine infrared absorption spectra were taken at periodic intervals. The taking of these infrared spectra was accomplished by rotating the inner portion of cell 1 so that cesium bromide window 9 was lined up with silver sulfied coated silver chloride cell windows 10' and 10". An infrared spectrum was taken on a Beckman IR–9 spectrometer and then the inner portion of cell 1 was again adjusted for the continued irradiation of the nitrogen-$OF_2$ coated window 9. The infrared spectra showed a steady increase in the 1026 and 1031 cm.$^{-1}$ absorption bands and a steady decrease in the 918 cm.$^{-1}$ band indicating the production of mono-oxygen monofluoride with a corresponding decrease in mono-oxygen difluoride. At the end of the 69 minute period the solid matrix on window 9 was allowed to warm to 42° K. and then was cooled back down to 4° K. Another infrared spectrum was taken and the 1026 and 1031 cm.$^{-1}$ bands completely disappeared and the 918 cm.$^{-1}$ band increased by an amount which indicated mono-oxygen monofluoride had been present in the solid nitrogen matrix in an amount of at least 0.6 wt. percent.

EXAMPLE II

This example further illustrates the production of OF.

The procedure of Example I was essentially duplicated. Several runs were made utilizing nitrogen and argon as the matrix and two isotopic oxygen difluorides wherein the oxygen therein are the 16 and the 18 isotopes. The test data and results are reported below in Table I.

TABLE I

[Absorptions (cm.$^{-1}$) produced during the photolysis of $OF_2$ at 4° K.]

| Matrix | $O^{16}$ run, cm.$^{-1}$ | $O^{18}$ run, cm.$^{-1}$ | Δγ (Obs.) | Δγ (Calc'd)[1] |
|---|---|---|---|---|
| $N_2$ | 1,030.5 | 999.5 | 31.0 | 31.6 |
|  | 1,025.5 | 994.5 | 31.0 | 31.4 |
| Ar | 1,028.5 | 997.4 | 31.1 | 31.5 |

[1] Calculated for the frequency shift due to mass chnage in going from $O^{16}$ F. to $O^{18}$ F.

In regard to the data in the above table the close relationship between the observed and calculated difference between the absorptions obtained in the $O^{16}$ Run and the $O^{18}$ Run clearly demonstrates the presence of mono-oxygen monofluoride of the formula OF.

EXAMPLE III

The example illustrates the effect of the use of the additive in the method of the invention.

The procedure of Example I was essentially repeated except runs were made which include the employment of nitrous oxide as an additive. The amount of mono-oxygen monofluoride produced was measured by the amount of infrared absorbance in the 1025.5 and 1030.5 cm.$^{-1}$ infrared bands which are assigned to mono-oxygen monofluoride. The greater the absorbance the greater the amount of mono-oxygen monofluoride produced. The test data and results are reported below in Table II.

TABLE II

[The effects of added $N_2O$ on OF radical production]

| Ingredient conc. in moles of solution to be irradiated | | | Irrad. time, minutes | OF product absorbance | | |
|---|---|---|---|---|---|---|
| $OF_2$ | $N_2$ | $N_2O$ | | 1030.5 | 1025.5 | Total |
| 1 | 40 |  | 53 | 87 | 46 | 133 |
| 1 | 40 | 1 | 51 | 61 | 150 | 211 |
| 1 | 40 | 0.5 | 49 | 67 | 138 | 205 |
| 1 | 40 | 0.25 | 49 | 66 | 132 | 198 |

The above clearly indicated the presence of nitrous oxide in a $OF_2$-$N_2$ solution increases the production of mono-oxygen monofluoride.

The foregoing was also repeated substituting $CO_2$ for $N_2O$ and the results were essentially of the same order as above.

We claim:

1. A composition comprising mono-oxygen monofluoride in the solid state and a matrix in the solid state selected from the group consisting of nitrogen, argon, neon, krypton, xenon, sulfur hexafluoride, hexafluoroethane and trifluorochloromethane, said mono-oxygen monofluoride and said matrix being present in a mole ratio of between about 1:10 and 1:1000 of OF:matrix.

2. A composition in accordance with claim 1 wherein said matrix is nitrogen.

3. A composition in accordance with claim 1 wherein said matrix is argon.

4. A method of producing mono-oxygen monofluoride comprising irradiating a solid solution of mono-oxygen difluoride and a matrix selected from the group consisting of nitrogen, argon, neon, krypton, xenon, sulfur hexafluoride, hexafluoromethane and trifluorochloromethane at a temperature below the diffusion temperature of said matrix with actinic light having a wavelength between about 2200 and 6000 A., the mole ratio of said mono-oxygen difluoride to said matrix initially in said solution is less than about 1:10.

5. A method in accordance with claim 4 wherein said irradiation is conducted at a temperature between about 4 and 35° K.

6. A method in accordance with claim 5 wherein said matrix is nitrogen.

7. A method in accordance with claim 5 wherein said matrix is argon.

8. A method of producing mono-oxygen monfluoride comprising irradiating a solid solution of mono-oxygen difluoride, matrix and additive at a temperature below the diffusion temperature of said matrix with actinic light having a wavelength between about 2200 and 6000 A., the mole ratio of said mono-oxygen difluoride:additive:matrix being less than about 1:4:10, said matrix selected from the group consisting of nitrogen, argon, neon, krypton, xenon, sulfur hexafluoride, hexafluoroethane and trifluorochloromethane, and said additive selected from the group consisting of nitrous oxide and carbon dioxide.

9. A method in accordance with claim 8 wherein said irradiating is conducted at a temperature between about 4 and 35° K.

10. A method in accordance with claim 9 wherein said matrix is nitrogen and said additive is nitrous oxide.

11. A method in accordance with claim 9 wherein said matrix is nitrogen and said additive is carbon dioxide.

References Cited

Staricco et al.: "Zeitschrift für Physikalische Chemie Neve Folge," vol. 31, pp. 385–396 (1962).

Simon: "Fluorine Chemistry," vol. 1, p. 84 (1950). Z. Physik. Chem. (Leipzig) B24, 328 (1934); B25, 283 (1934). Z. Physik. Chem., Neve Folge, 35, 122 (1962); 32, 24 (1962); 31, 385 (1962); 36, 211 (1963). J. Chem. Phys., 27, 1296 (1957).

OSCAR R. VERTIZ, *Primary Examiner.*

H. S. MILLER, *Assistant Examiner.*

U.S. Cl. X.R.

204—157.1